United States Patent [19]

Pellegrino et al.

[11] Patent Number: 5,216,250
[45] Date of Patent: Jun. 1, 1993

[54] DIGITAL IMAGING SYSTEM USING CCD ARRAY

[75] Inventors: Anthony J. Pellegrino, New Fairfield; David D. Camarra, Fairfield, both of Conn.

[73] Assignee: Lorad Corporation, Danbury, Conn.

[21] Appl. No.: 799,413

[22] Filed: Nov. 27, 1991

[51] Int. Cl.$^5$ .............................................. H05G 1/64
[52] U.S. Cl. ................................. 250/370.09; 378/62; 250/370.11
[58] Field of Search ..................... 250/370.09, 370.11; 378/99, 62; 358/483

[56] References Cited

U.S. PATENT DOCUMENTS

| | | | |
|---|---|---|---|
| 4,245,158 | 1/1981 | Burstein | 250/370.09 |
| 4,503,460 | 3/1985 | Sklebitz | 358/14 |
| 4,803,714 | 2/1989 | Vlasbloem | 378/62 |
| 4,852,137 | 7/1989 | McKay | 378/62 |
| 4,873,708 | 10/1989 | Cusano | 250/370.09 |
| 4,878,234 | 10/1989 | Pfeiffer | 250/370.09 |
| 4,901,336 | 2/1990 | Nishiki | 250/370.09 |
| 4,901,337 | 2/1990 | Fujimoto | 250/370.09 |
| 4,905,265 | 2/1990 | Cox | 378/99 |
| 4,950,421 | 8/1990 | Davis, Jr. et al. | 250/352 |
| 4,987,307 | 1/1991 | Rizzo | 250/370.09 |
| 5,008,915 | 4/1991 | Vlasbloem | 378/62 |
| 5,027,380 | 6/1991 | Nishiki | 378/99 |
| 5,038,369 | 8/1991 | Nishiki | 378/62 |
| 5,044,003 | 8/1991 | Zuidhof | 378/99 |

OTHER PUBLICATIONS

Mouyen, et al; Presentation and Physical Evaluation of Radio Visiography; Oral Surgery, Oral Medicine, Oral Pathology: vol. 68, No. 2, pp. 238-242; St. Louis, Aug., 1989.

Razzano, et al; Radio Visio Graphy: Video Imaging Alters Traditional Approach to Radiography; 398 Compend Contin Educ Dent, vol. XI, No. 6, pp. 398-400, c. 1990.

Radio Visio Graphy; The End of the Dark Ages of Radiography; Trophy U.S.A. Inc. ad.

Primary Examiner—Carolyn E. Fields
Assistant Examiner—Drew A. Dunn
Attorney, Agent, or Firm—Ware, Fressola, Van Der Sluys & Adolphson

[57] ABSTRACT

A digital imaging charge coupled device or CCD camera has a hollow camera body defining a sealable interior focal plane chamber enclosing a CCD array positioned to receive light focused thereon through a light-transparent window. The interior chamber also encloses a molecular sieve moisture adsorber of crystalline alumino-silicate material, and the chamber is evacuated, filled with inert nitrogen gas under slightly elevated pressure and then sealed, minimizing the partial pressures of water vapor or outgassing gases and reducing or eliminating their efforts on the CCD array.

4 Claims, 3 Drawing Sheets

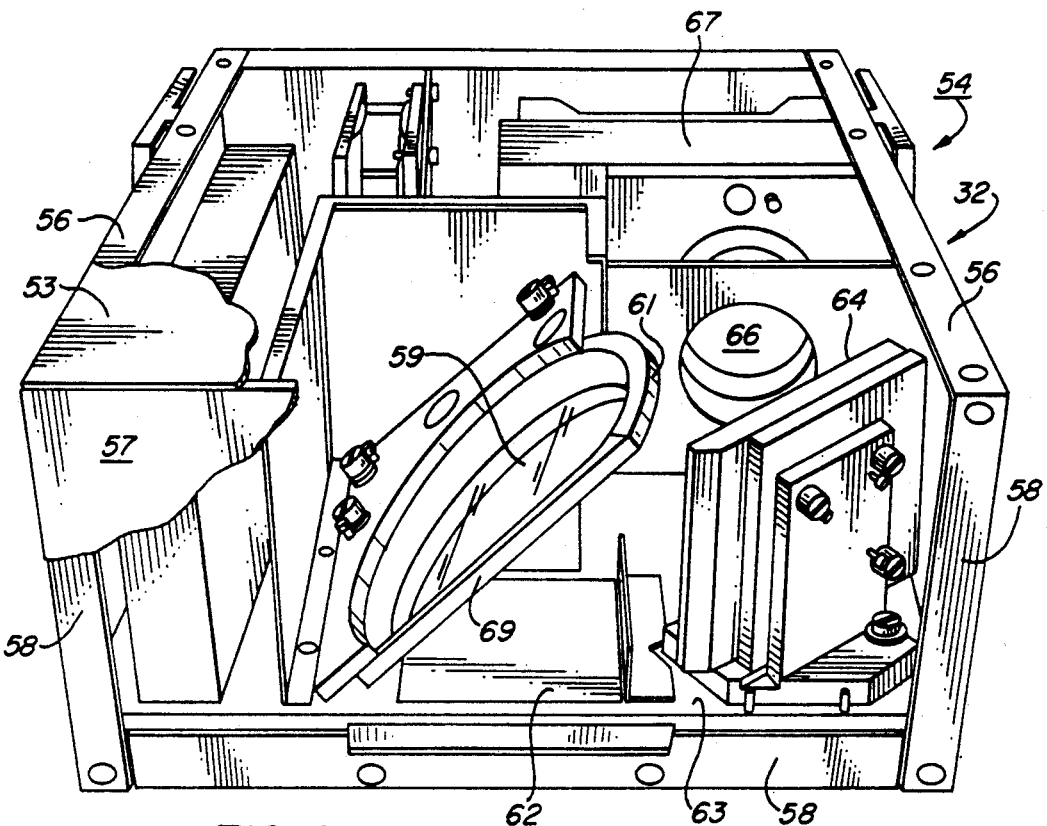
FIG. 2
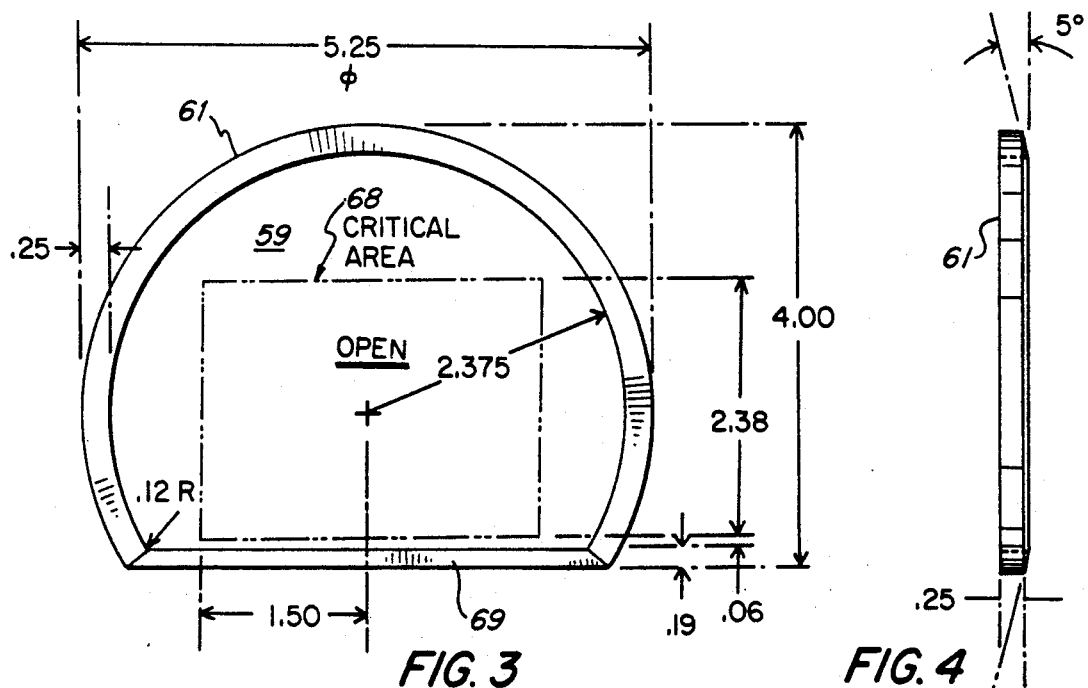
FIG. 3
FIG. 4

DIGITAL IMAGING SYSTEM USING CCD ARRAY

This invention relates to imaging systems for X-ray examination of patients or objects, and particularly to imaging systems capable of significant image enhancement through the use of digital circuitry and software.

RELATED ART

Digital imaging using CCD arrays has often been proposed, but performance and useful life of these image sensing arrays has been disappointing, apparently because charge coupled devices with adequate initial sensitivity do not exhibit the longevity desired.

SUMMARY OF THE INVENTION

A CCD array camera with greatly extended sensitivity over a long useful life has been produced by utilizing several significant features. The CCD array mounted on a "cold finger" thermoelectric cooler pedestal is placed inside an air-tight camera housing, at the focal plane of a focussing lens system delivering light rays through an air-tight, light-transparent window. The air-tight camera housing is evacuated, and inert nitrogen is introduced at a few p.s.i. above atmospheric pressure, after which the housing is sealed.

A printed circuit board carrying the circuit components directly connected to the CCD array is enclosed in the sealed housing, and a water-adsorbent material, called a molecular sieve, is mounted in the sealed housing, reducing or virtually eliminating the partial pressure of water vapor therein.

The nitrogen under pressure is believed to minimize so-called "out-gassing" of molecules from the surfaces of the various solid materials inside the camera, and this together with the extremely low partial pressure of water vapor are believed to account for the efficient operation and long useful life of the cameras of this invention.

Accordingly, it is a principal object of this invention to provide a CCD array digital imaging system capable of highly efficient operation and unusual longevity.

Another object is to provide such CCD array imaging system suitable for use in X-ray examination of patients and tangible objects.

Still another object is to provide such digital imaging systems useful for X-ray mammography and for other radiological examination of patients.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

THE FIGURES

For a fuller understanding of the nature and objects of the invention, reference should be made to the following detailed description taken in connection with the accompanying drawings, in which:

FIG. 2 is a perspective top view of a folded optical system employed to focus the phosphor plate's image on the CCD sensor, with a portion of the light-tight housing removed to reveal the location of the various components of the optical system;

FIG. 3 is a top plan view of the thin film pellicle mirror employed in the optical system of FIG. 2;

FIG. 4 is an edge elevation view of the same pellicle mirror;

BEST MODE FOR CARRYING OUT THE INVENTION

Figure 1:
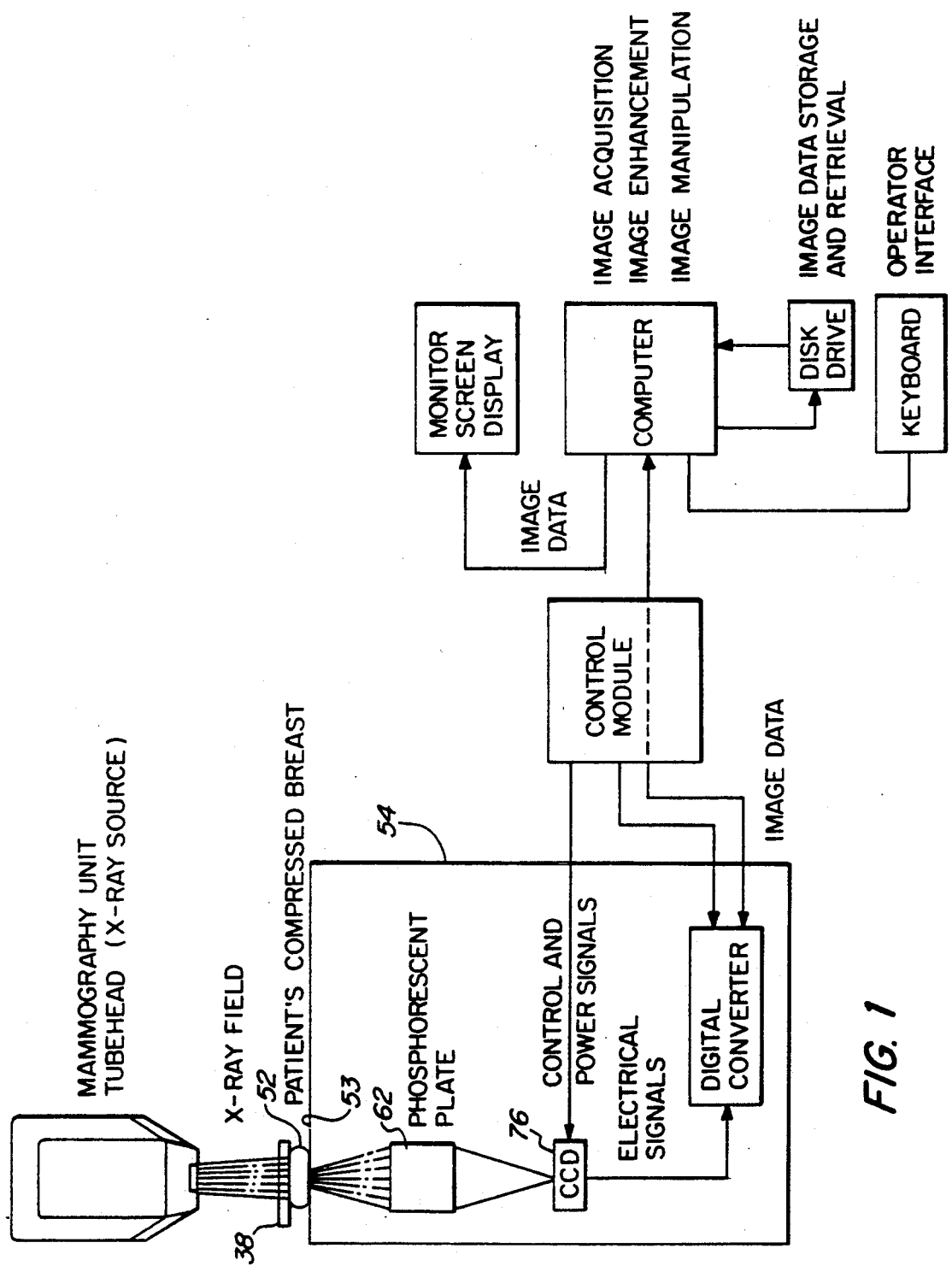
FIG. 1 is a schematic diagram showing an X-ray mammography patient's compressed breast imaged on a phosphor plate in the optical system delivering a focussed image to the CCD sensor and the processing of the CCD output signals through the image enhancement computer to the monitor screen display.

While the digital imaging systems of this invention are useful in many different fields, they are illustrated schematically in FIG. 1 in an X-ray mammography system, in which X-radiation passes through the patient's compressed breast, and falls on a phosphor plate. Projection of X-rays from two different source positions provides data permitting stereotactic imaging, and quick and accurate determination of the coordinates of suspect lesions or any internal anomalies in the breast tissue.

By minimizing the length of time a patient is required to remain in the same prone position, the patient's comfort and also the patient's relative immobility will be enhanced, minimizing inaccuracies which might be unavoidable if a patient were expected to lie still in the same position for a long period of time.

ELECTRONIC IMAGING SYSTEM

Stereotactic imaging of breast tissue by projecting X-rays through the patient's compressed breast from two different source positions to produce two stereo images on an X-ray film is disclosed in detail in the Bolmgren article, supra, from the American Journal of Roentgenology for July 1977 and also in U.S. Pat. Nos. 4,727,565 to Ericson and 4,930,143 to Lundgren. FIG. 1 shows a schematic diagram of such X-ray mammography with the tissue of a patient's breast 52 compressed between a fixed compression plate 53 and an adjustable compression plate 38, both of which are transparent to X-rays. Fixed compression plate 53 preferably comprises the proximal surface of a light-tight housing 54 enclosing a folded optical system of the CCD electronic imaging in the preferred forms of the present invention. The principal internal components of the folded optical system are shown schematically in FIG. 1 and in the cutaway top perspective view of FIG. 2, where the X-ray transparent fixed compression plate 53 forming the proximal or front wall of a housing 54 has been removed from its supporting proximal flanges 56, to reveal the internal structures inside housing 54. In the same manner, an upper housing panel 57 has been removed from its upper supporting flanges 58, thus revealing the internal structure of the optical system 32. Fragmentary portions of panel 57 and fixed compression plate 53 are shown at the left side of FIG. 2.

As indicated in FIGS. 1 and 2, radiation from the X-ray tubehead 28 passes successively through the X-ray transparent adjustable compression plate 38, the patient's breast 52, the fixed compression plate 53, and then through a thin film pellicle mirror 59. This is a film of high tensile strength elastic membrane material such as nitrocellulose having a thickness ranging between 5 and 9 microns (micrometers), for example, stretched like a drumhead over a flat metal frame 61 and bonded to the precision lapped edge of this frame.

The thin pellicle film is virtually transparent to X-radiation which passes directly through it to impinge upon the underlying phosphor screen 62 mounted on the rear wall 63 of the housing 54.

The digital data handling operation is facilitated by the remaining portions of the optical system. These include the coated underside of the pellicle film 5 which serves as a mirror reflecting the image of phosphor plate 62 toward a second mirror 64, which delivers the reflected image of the phosphor plate 62 to lens 66 of the CCD equipped camera 67.

Figure 5:
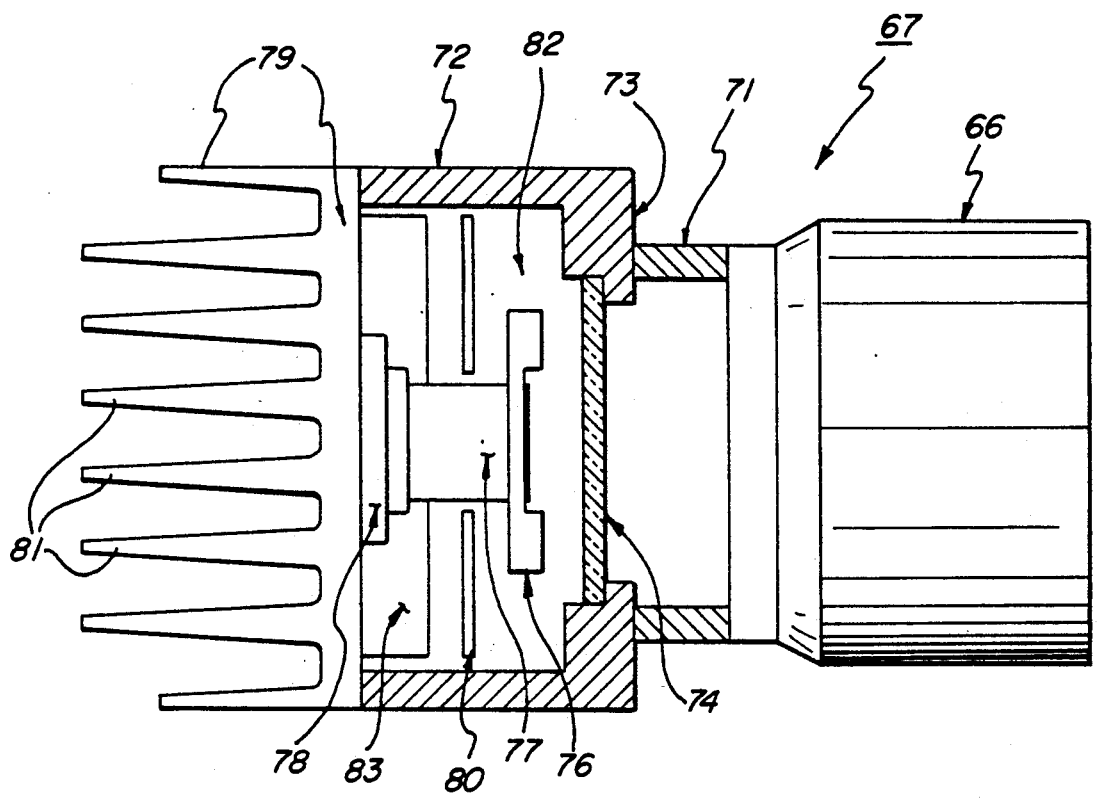
FIG. 5 is a detailed schematic diagram of a preferred form of CCD camera employed in the optical system of FIG. 2.

Thus, as viewed from above looking down in FIG. 5, the image of the phosphor screen 62 is reflected from the underside of pellicle film 59 to the right toward the angularly positioned mirror 64 which then directs it downward toward the lens 66, clearly shown in FIG. 15 overlying the CCD camera 67. The camera, operating in the snapshot mode, integrates the image from the phosphor plate 62 and at the end of the exposure, the image is stored in computer memory. This operation is performed for the image produced by the X-ray source at its first tubehead position, and it is then repeated for the second source tubehead position and another exposure is made. Thus in a few seconds, two stereo pair images are obtained and stored in the associated computer. The operator then brings the images to the monitor and using a track ball, places cursor locators on the images of index calibration marks and on the lesion images.

Based on the position of these cursors on the monitor screen, the computer then calculates the X, Y and Z location of the lesion relative to images of X-ray opaque index points on the breast compression plate 38 or 53.

These X, Y and Z coordinates may be used immediately for fine needle biopsy, using a needle guide to direct the biopsy needle to the site of the lesion, where two more stereo images are recorded to confirm the accurate positioning of the needle tip at the lesion site. Alternatively, these images may also be employed to guide surgery if desired.

The pellicle film thickness preferably falls between five and nine micrometers, and most desirably falls within the range of six to seven micrometers, with the thickness uniformity being accurate and the faces of the film being parallel within two wavelengths of X-radiation per inch. A coating of aluminum and silicon dioxide on the underside of the pellicle film provides a reflectance greater than 8%, with no pinholes being visible to the unaided eye, thus assuring the uniformity of the resulting CCD image. While normal pellicle mirror frames 61 are ring shaped, the unique "D-shaped" configuration of the pellicle mirror 59 and frame 61 in the optical systems of the preferred embodiments of the invention provide a unique advantage: the rectangular area 68 corresponding to the pellicle film reflection of the phosphor plate 62 is uniformly smooth and flat over its entire surface and it will be noted that the circular sector of frame 61 subtends approximately 250 degrees, while the straight chord 69 closing of the D-shaped frame 61 subtends the remaining angle of about 110 degrees. This D-shaped frame 61 thus rings the critical area 68 very close to the adjacent chord segment 69 of frame 61, as shown in FIG. 16. Chord segment 69 is positioned closely adjacent to upper housing panel 57, as can be observed in FIG. 15, thus bringing the critical area for imaging X-radiation passing through the patient's breast 52 close to platform 22, and producing a visible image on the phosphor plate 62 in close juxtaposition with upper housing panel 57, which is positioned vertically as close as possible to the patient's chest wall. By this means, the maximum volume of the patient's breast 52 is exposed to the mammographic examination using the X-radiation passing through the D-shaped pellicle mirror 59.

PREFERRED FORM OF THE CCD DIGITAL IMAGING OPTICAL SYSTEM

The preferred form of CCD Camera 67 is shown schematically in more detail in FIG. 5. In this diagram, lens 66 is supported on a lens mount 71 positioned on the front face 73 of camera body 72. Face 73 incorporates a light-transparent window 74 behind which CCD array 76 is positioned. Light focussed by lens 66 is delivered through window 74 to a focal plane corresponding to the face of CCD array.

Array 76 is mounted on the front end of a "cold finger" pedestal 77 whose rear end is anchored to a Peltier thermoelectric cooler 78 mounted on the rear face 79 with heat-transfer fins 81 extending into the ambient atmosphere. A ring-shaped printed circuit board 80 closely encircles "cold finger" pedestal 77, minimizing resistance losses in the conductors (not shown in FIG. 5) connecting CCD array 76 to board 80.

As shown in FIG. 5, camera body 72 with its front and rear faces 73 and 79 forms an enclosed chamber 82, which is preferably sealed and evacuated, and then filled with inert nitrogen gas, thus drastically reducing the number of gas molecules available in chamber 82 to combine with or affect the CCD array 76, and the nitrogen's pressure virtually blocks "outgassing" or evaporation of molecules of materials exposed to the interior of chamber 82, such as the camera body 72, window 74, printed circuit board 80, the cold finger pedestal 77 or the thermoelectric cooler 78.

An additional feature of the preferred form of the CCD cameras of this invention is a molecular sieve 83 positioned in chamber 82, formed of crystalline zeolites and highly active in adsorbing and holding any water molecules present. This minimizes the partial pressure of any water vapor which might evaporate from the other materials exposed to the interior of chamber 82.

Union Carbide or UOP molecular sieves and Multiform Dessicants, Inc. Natrasorb 900 moisture adsorbers are suitable crystalline alumino-silicate materials with organic binders such as inert clay, formed into lightweight solid blocks which can be easily machined, like aluminum or nylon.

Prior CCD cameras have proved less effective than desired. It is believed that the presence of outgassed molecules and water vapor molecules in the CCD chamber have deleteriously affected the CCD arrays' effectiveness and useful life. The discovery that zeolite molecular sieves and a nitrogen local atmosphere in the sealed CCD array chamber significantly extend the useful life and effectiveness of the CCD camera is believed to be a valuable contribution to the digital imaging field.

It will thus be seen that the objects set forth above, and those made apparent from the preceding descriptions, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A digital imaging CCD camera for X-ray examination of patients and tangible objects, comprising:
   a hollow camera body forming a sealable interior chamber,
   a light transparent window forming one wall of said chamber,
   a CCD array mounted inside the chamber facing said window,
   light-focussing means directing light rays through said window onto said CCD array,
   said chamber being evacuated to a low atmospheric pressure, then filled with nitrogen at a pressure greater than normal atmospheric pressure, and subsequently sealed,
   whereby the partial pressures of other gases in said chamber are minimized, significantly extending the useful life of the CCD array.

2. A digital imaging CCD camera for X-ray examination of patients and tangible objects, comprising:
   a hollow camera body forming a sealable interior chamber,
   a light-transparent window forming one wall of said chamber,
   a CCD array mounted inside the chamber facing said window,
   light-focussing means directing light rays through said window onto said CCD array,
   a molecular sieve moisture adsorber of crystalline alumino-silicate material in an inert organic binder positioned inside said chamber,
   said chamber being evacuated to a low atmospheric pressure, and subsequently sealed,
   whereby the partial pressures of water vapor in said chamber are minimized, significantly extending the useful life of the CCD array.

3. A digital imaging CCD camera for X-ray examination of patients and tangible objects, comprising:
   a hollow camera body forming a sealable interior chamber,
   a light-transparent window forming one wall of said chamber,
   a CCD array mounted inside the chamber facing said window,
   light-focussing means directing light rays through said window onto said CCD array,
   a molecular sieve moisture adsorber of crystalline alumino-silicate material in an inert organic binder positioned inside said chamber,
   said chamber being evacuated to a low atmospheric pressure, then filled with nitrogen at a pressure greater than normal atmospheric pressure, and subsequently sealed,
   whereby the partial pressures of water vapor and of other gases in said chamber are minimized, significantly extending the useful life of the CCD array.

4. The digital imaging CCD camera defined in claim 3, further including:
   an X-ray responsive image forming means including a phosphor plate producing a visible light image in response to arriving X-radiation impinging thereon,
   and a diagonally positioned pellicle mirror interposed in the path of said arriving X-radiation, with its undersurface positioned to reflect said phosphor plate's visible light image toward said light focussing means.

* * * * *